United States Patent [19]

Brown et al.

[11] 4,279,504

[45] Jul. 21, 1981

[54] COPIER AND MULTIFUNCTION PAPER CASSETTE

[75] Inventors: Leon C. Brown; Uscoe J. Fitts, both of Boulder; David R. Polakowski, Longmont, all of Colo.

[73] Assignee: International Business Machines Corporation, Armonk, N.Y.

[21] Appl. No.: 107,000

[22] Filed: Dec. 26, 1979

[51] Int. Cl.³ ............................................. G03B 27/58

[52] U.S. Cl. ...................................... 355/72; 271/3.1; 355/3 SH; 355/14 SH; 355/24

[58] Field of Search ............ 355/72, 24, 3 SH, 14 SH, 355/16, 3 R, 8, 3 DD, 26; 271/4, 3.1, 9, 127, 160, 163, 218

[56] References Cited

U.S. PATENT DOCUMENTS

| | | | |
|---|---|---|---|
| 3,575,506 | 4/1971 | Knechtel | 355/16 |
| 3,645,615 | 2/1972 | Spear, Jr. | 271/9 X |
| 3,751,155 | 8/1973 | Liechty | 355/3 SH |
| 3,809,472 | 5/1974 | Liechty | 355/3 R |
| 3,832,057 | 8/1974 | Shogren | 355/8 |
| 3,905,697 | 9/1975 | Komori et al. | 355/26 |
| 3,972,612 | 8/1976 | Komori et al. | 355/26 |
| 3,989,236 | 11/1976 | Komori et al. | 271/4 |
| 3,999,514 | 12/1976 | Abbott et al. | 355/3 DD X |
| 4,017,181 | 4/1977 | Komaba et al. | 355/72 |
| 4,050,805 | 9/1977 | Hage | 355/14 SH |
| 4,087,178 | 5/1978 | Pfeifer et al. | 355/72 |
| 4,098,551 | 7/1978 | Komori et al. | 355/3 R |
| 4,110,025 | 8/1978 | Tabata | 355/3 SH |
| 4,110,030 | 8/1978 | Knechtel | 355/3 SH X |
| 4,141,648 | 2/1979 | Gaitten et al. | 355/3 CH |

OTHER PUBLICATIONS

IBM Technical Disclosure Bulletin, "Erase Lamp Control", Underhill, vol. 19, No. 2, Jul. 1976, pp. 393, 394.

*Primary Examiner*—Richard A. Wintercorn
*Attorney, Agent, or Firm*—Francis A. Sirr; Earl C. Hancock

[57] ABSTRACT

A xerographic copier having a removable, multifunction paper cassette, the cassette functioning as the copier's paper supply, the copier's exit tray and the copier's single-sheet bypass entry station. The cassette is held at an acute angle to the horizontal, and includes a substantially solid upper wall whose lower portion includes a slot which exposes the paper supply stack's top sheet to paper feed roller means. Paper is fed, one sheet at a time, to a paper path which includes a transfer station and a hot roll fusing station. This paper path traverses a loop, such that the finished copy comes to rest on the solid upper wall of the cassette. The lower portion of this solid upper wall includes a movable paper gate which, when closed, allows multiple copies to be stacked before removal by the operator. If the operator wishes to copy in the bypass mode, a single sheet is inserted onto the cassette's solid upper wall, and the gate is opened, allowing the lower edge of the bypass sheet to be placed on top of the top sheet of the paper supply stack. This bypass sheet is used as the next sheet in a copy process. Removal of the cassette, or movement of the paper gate to its open position, controls the copier's interimage erase station to erase for the longest paper which can be used in the copier.

30 Claims, 14 Drawing Figures

COPIER AND MULTIFUNCTION PAPER CASSETTE

DESCRIPTION

TECHNICAL FIELD

The present invention pertains to the field of document copiers having cassette paper supply.

BACKGROUND OF THE INVENTION

Prior to this invention, copier construction and arrangement is known to have provided sheet bypass capability to feed single sheets or to feed from a bypass stack, either manual or automatic, and to effect duplex copying using such bypass.

U.S. Pat. Nos. 3,645,615; 4,050,805 and 4,098,551 are exemplary of copiers capable of making simplex or duplex copies. When operating in the duplex mode, all necessary side-one copies are automatically diverted to a tray where they then reside in a stack. Subsequently, they are automatically fed out, in a bypass sense, and on a last-in first-out basis, for second-side copying.

U.S. Pat. Nos. 4,110,025 and 4,110,030 show arrangements as above where a single sheet bearing a side-one copy is immediately used, in a bypass sense, for side-two copying, as distinguished from stacking all side-one copies prior to beginning side-two copying.

U.S. Pat. Nos. 3,905,697 and 3,972,612 are exemplary of arrangements where duplex copying is accomplished by manually taking a stack of side-one copies from the copier's exit tray, and inserting them in the copier's original paper supply bin for side-two copying. In U.S. Pat. No. 3,989,236 this function is accomplished by a movable exit tray which swings into the position of the original paper supply tray, and in so doing carries a stack of side-one copies for use as the original paper supply while copying side-two on the blank side thereof.

U.S. Pat. No. 4,017,181 shows arrangements whereby manual sheet bypass is accomplished by providing an original paper feed cassette whose upper horizontal wall includes a slot such that a bypass stack of sheets may be inserted so that the leading edge of this bypass stack replaces the original stack in cooperation with paper feed means. In U.S. Pat. No. 4,087,178 a similar cassette is provided for single sheet bypass. The upper wall of this cassette includes indicia and a registration edge to insure proper manual placement of the bypass sheet.

SUMMARY OF THE INVENTION

As used herein, the term bypass, or application bypass, is intended to mean the function and ability of a human operator to use paper other than the copier's paper supply as the copy medium. This function is most often used to produce a few copies, and usually only one, on special paper, such as preprinted letterhead, transparencies, colored paper, different size paper than that in the copier's paper supply, to make two-sided copies (duplexing), and the like. Functionally, all that is required is a copier construction and arrangement which allows the operator to insert a bypass sheet into a specified copier location or slot, where the presence of this sheet causes the sheet to be transported to the copy process as a substitute for a sheet from the copier's paper supply. This bypass concept is well known to those of skill in the related art.

The present invention provides a copier having a multifunction paper cassette. Specifically, the cassette of the present invention provides storage for a stack of sheets normally used in the copy process, provides a copier exit tray capable of holding a number of copies as they are sequentially produced by the copier, and provides a single-sheet bypass entry station for application bypass use in the copy process.

More specifically, the cassette of the present invention is a substantially closed, box-like device whose internal paper stack has its leading edge exposed at a slot-like opening formed in the upper wall of the cassette. When this cassette is mounted to the copier, the copier's paper feed rollers cooperate with the top sheet in the stack, and operate to feed one sheet at a time to the copier's transfer station. Thereafter, the copy's toner image is fused. The copier's paper path is a complete loop, such that the finished copy emerges from the copier, image side up, and comes to rest on top of the cassette. The cassette includes a movable gate on its upper surface, adjacent the slot-like opening, and the trailing edge of a copy comes to rest against this gate. Thus, the cassette performs the function of the copier's exit tray. For bypass application, for example duplex copying, the side-one copy is placed in this exit tray position, side-one-up, and the gate opens to allow this copy to replace the stack's top sheet as the next sheet to be used in the copy process. If the copy process is an end-to-end process, such as for example a process which copies a page top-to-bottom, or vice versa, then the side-one copy must be reversed so that the sheet's side-one leading edge is also the leading edge for side-two copying. In the alternative, the original document which comprises side-two can be end-for-end reversed from the side-one original document. If the copy process is a side-to-side process, neither side-one copy nor the side-two original need be reversed.

The copier of the present invention includes a cassette switch which is operable to control the copier's interimage erase function. More specifically, the withdrawal of the cassette actuates this switch. Upon subsequent replacement of the cassette, and the initiation of a copy cycle, the copier's erase function is always controlled to erase for the larger legal size paper. The size of the first sheet (and all subsequent sheets) to be fed in this copy cycle is measured, and the erase function is subsequently controlled to correspond to the size paper actually in use. The above-mentioned gate, associated with the exit tray and bypass functions of the cassette, cooperates with this switch, such that opening of the gate to initiate a bypass function also causes the copier's erase function to default to the legal size erase.

Thus, it can be seen that the copier of the present invention accomplishes multiple functions from a unique paper supply cassette and its cooperation with the copier.

The foregoing and other features of this invention, as well as its advantages and applications, will be apparent from the following detailed description of the preferred embodiments which are illustrated in the accompanying drawing.

BRIEF DESCRIPTION OF THE DRAWING

FIG. 6 showing the feeding of a sheet for side-one copying; FIG. 7 showing the return of the sheet as a side-one copy; FIG. 8 showing the feeding of the side-one copy as a bypass sheet, for side-two copying; and FIG. 9 showing the return of the sheet as a duplex copy;

DESCRIPTION OF THE PREFERRED EMBODIMENTS

Figure 1:
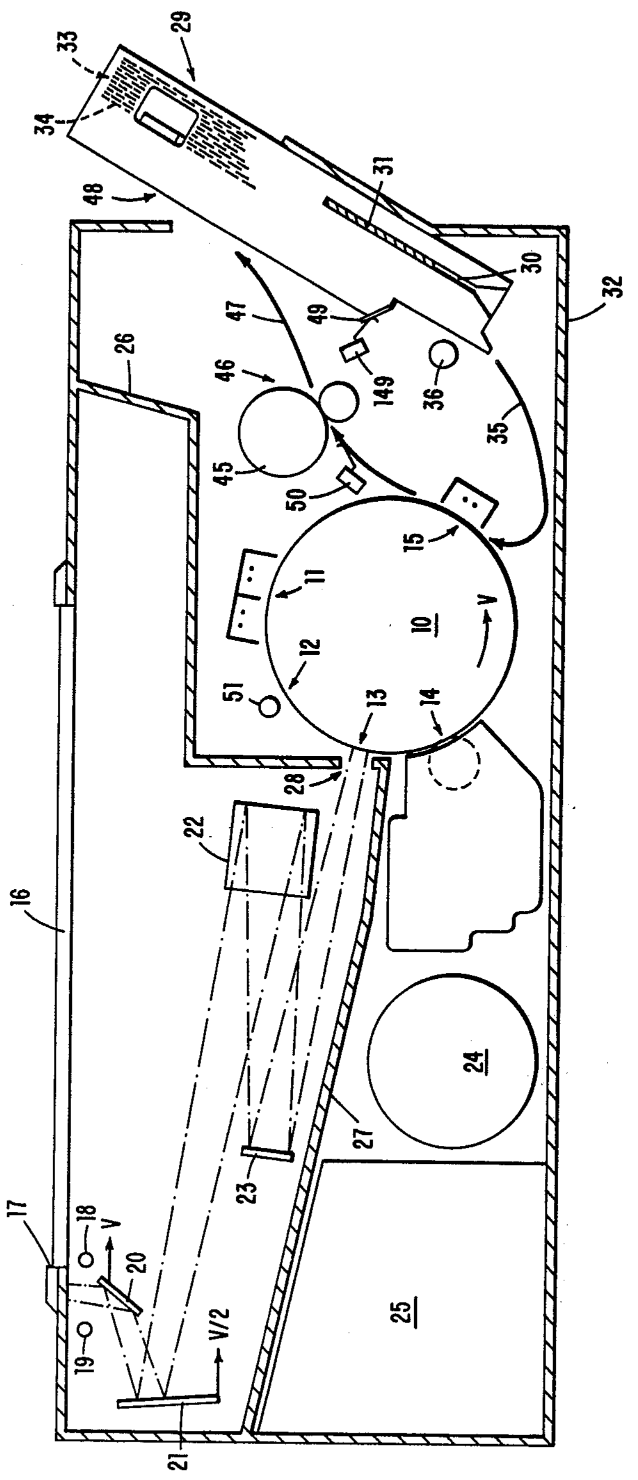
FIG. 1 is a side schematic view of a xerographic copier incorporating the present invention.

FIG. 1 is a side schematic view of a xerographic copier incorporating the present invention. In this copier, drum photoconductor 10 rotates counterclockwise at a constant velocity V during the copy cycle. In so moving, a given portion of the photoconductor sequentially passes under the influence of a charging station 11, an interimage erase station 12, an imaging station 13, a developing/cleaning station 14, and a transfer/precharge station 15.

Combined developing/cleaning station 14 comprises a magnetic brush developer, and may be of the type disclosed in U.S. Pat. No. 3,999,514, incorporated herein by reference.

The copier of FIG. 1 is a two-cycle copying device wherein a given portion of photoconductor drum 10 is sequentially subjected to charging, imaging, developing, transferring and then cleaning. Dual bay corona 11 performs either a charge function or a precleaning-charge function at the proper time and during the proper cycle of drum 10. Transfer station 15 includes a corona which is a combined precharge/transfer corona. This corona also performs its proper function at the proper time and during the proper cycle of drum 10. Such a two-cycle copier is disclosed in U.S. Pat. No. 4,141,648, incorporated herein by reference.

This copier is of the type commonly referred to as a desk top copier, and includes an upper, horizontal platen 16 adapted to carry an original document which is front-edge referenced at reference edge 17. The optical system of the copier comprises light sources 18, 19, moving mirrors 20, 21, stationary lens/mirror 22 and stationary mirror 23. By virtue of this optical system, the original document resident on platen 16 is line-scanned, and a flowing line image of the document is formed at photoconductor 10 as the photoconductor passes by imaging station 13. As is well known, mirror 20 moves at the same velocity V as the photoconductor drum, whereas mirror 21 moves at one-half this velocity. The construction and arrangement of the copier of FIG. 1, well known to those of skill in the art, is such that the leading reference edge 17 is always placed at the same position on photoconductor drum 10, this being represented by the numeral 17 of FIG. 3.

The optical system of FIG. 1, whereby a stationary original document on platen 16 is line-scanned to form a flowing latent image on moving drum 10, is of the type shown in U.S. Pat. No. 3,832,057, incorporated herein by reference.

The various mechanical drive forces required by the copier are supplied by a main drive motor 24. A compartment 25 is provided within the copier to contain the various logic, power supplies and the like necessitated by the copier.

The copier's optical system is contained within a housing identified by reference numerals 26 and 27. This housing provides a light opening only at slot 28 adjacent the photoconductor's imaging station 13.

The copier's paper supply is contained within cassette 29. This cassette carries a pair of identical slots 30, one slot being formed on each side of the cassette. The copier's frame mounts an extending, flat metal bracket 31 which cooperates with the cassette's slots 30 such that when brackets 31 bottom in the upper end of slots 30, cassette 29 is mechanically secured in the proper position within the copier. The cassette, when so mounted, makes an angle of approximately 60° to the horizontal bottom wall 32 of the copier.

Figure 2:
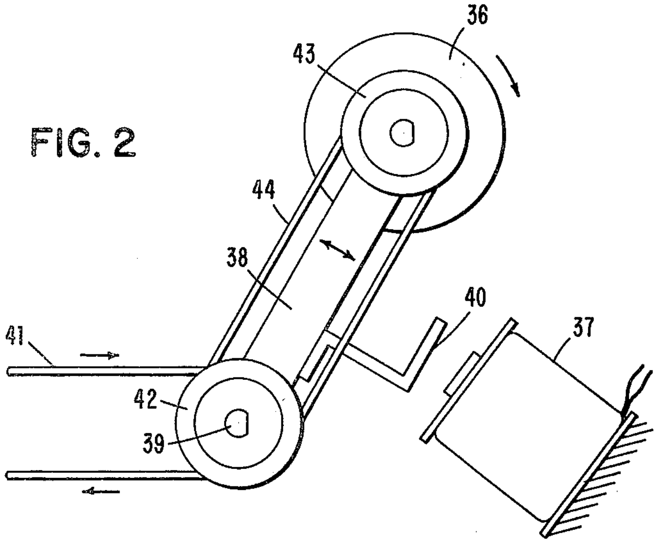
FIG. 2 is a showing of the paper feed mechanism of FIG. 1.

One of the functions of cassette 29 is to support a stack of plain paper 33 for use in the copy process. The top sheet 34 of the stack is fed to paper path 35 by operation of continuously rotating feed roller means 36. Feed roller means 36 is normally supported out of contact with the top sheet of the stack. With reference to FIG. 2, it can be seen that a paper feed solenoid 37, when energized, causes roller 36, and its metal support arm 38, to rotate clockwise about fixed position pivot 39 by virtue of attraction of solenoid armature 40 to solenoid 37. Drive belt 41 continuously moves so long as main drive motor 24 is energized, and causes pulley 42 to rotate clockwise, thus imparting clockwise rotation to pulley 43 by way of drive belt 44.

The construction and arrangement of this copier's paper feed mechanism can take many forms, as is apparent to those of skill in the art.

Referring again to FIG. 1, a piece of paper fed from stack 33 to the copy process first moves through transfer station 15 whereat a portion of the photoconductor's toned electrostatic latent image is transferred to the paper. Thereafter, the toned image is fused by hot roll 45 of hot roll fuser 46. The now-finished copy follows sheet path 47 to come to rest on the upper wall of cassette 29, this upper wall comprising exit tray 48. The copy can then be removed by the operator. If multiple copies of an original document are made, these multiple documents stack, toner image up, and are then removed at the end of the copy run by the operator.

The cassette's upper wall includes a gate 49 which constitutes the lower wall of the copier's exit tray 48. Finished copies exiting the copier by way of paper path 47 gravity-fall with their trailing edge abutting gate 49.

As the paper passes from transfer station 15 to hot roll fuser 46, a paper size sensor 50 cooperates with the paper to measure its length. This sensor may take a variety of forms, well known to those of skill in the art. For example, sensor 50 may comprise a switch which is actuated by the sheet's leading edge, and subsequently senses the sheet's trailing edge. The sheet moves through transfer station 15 and hot roll fuser 46 at a constant velocity which is substantially equal to the velocity of drum 10. Thus, the time during which sensor 50 senses the presence of a sheet is a direct measurement of the sheet's length.

Figure 3:
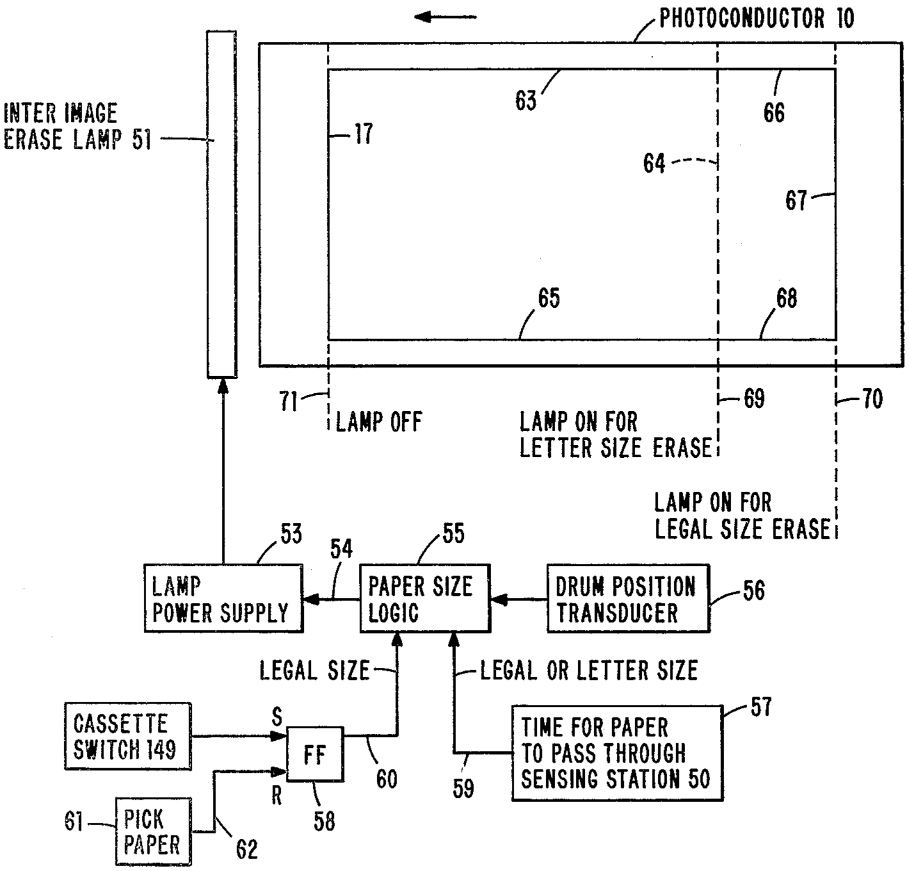
FIG. 3 is useful in explaining the operation of FIG. 1's interimage erase lamp, and the manner in which the present invention controls this erase lamp to always default to legal size erase on the first copy sheet when either the cassette has been removed and then replaced, or the cassette's bypass gate has been actuated.

With reference to FIG. 3, the copier's interimage erase function, as accomplished by interimage erase lamp 51, is controlled by both cassette switch 149 and paper size sensor 50. More specifically, interimage erase lamp 51 is on-off controlled by energization of its power supply 53 in accordance with a signal 54 received from paper size logic network 55. Paper size logic 55 is in turn controlled by a drum position transducer 56, a timer 57 which measures the time for paper to pass through paper size sensor 50, and flip-flop 58. The timer's output signal on line 59 is capable of controlling paper size logic 55 to achieve either legal or letter size interimage erase. However, the signal present on conductor 60, which is present whenever flip-flop 59 is set, forces a default to legal size erase. Flip-flop 59 is set by cassette switch 149 whenever cassette switch 149 senses that the cassette has been removed or whenever gate 49 is moved to its open position to initiate a bypass mode of operation. However, upon the occurrence of a paper feed operation, identified by network 61, flip-flop 58 is reset and paper size logic 55 is thereafter controlled by actual sheet size, i.e. by operating of timer 57. The signal present on conductor 62 which operates to reset flip-flop 58 originates in the same manner as the signal which energizes paper feed solenoid 37 of FIG. 2.

Flip-flop 58 remains set for two copy sheets, the second sheet being measured such that timer 57 is then enabled to control the erase function for the third sheet, dependent upon the sensed-size of the second sheet. This arrangement allows the bypass sheet (the first sheet) to be of a different length than the sheets in the cassette. When the second sheet is supplied from the cassette, its length is measured, and the third and all subsequent sheets (until the next occurrence of a signal from switch 149) are then assumed to be the size of the measured second sheet.

As an alternative, it may be reasonable to assume that bypass sheets will always be of the same length as the sheets in the cassette. In this case, it is possible to control logic 55 at the beginning of every copy cycle to always erase for the longest paper which can be used during the first copy cycle. The first sheet's length is then measured by timer 57 during this first copy cycle, and logic 55 is then set to control the erase function to the first sheet's actual size for the second and all subsequent sheets of that copy request, if in fact the request is for multiple copies.

The photoconductor erase concept is well known to those of skill in the art. Generally, this concept is that the nonworking area of the photoconductor is discharged prior to the photoconductor passing through developer station 14. As a result, toner consumption and cleaning capacity is reduced. More specifically, the photoconductor's working area is defined as that photoconductor area which will cooperate with a sheet from the copier's paper supply 33 at the copier's transfer station 15. In FIG. 2, the letter size working area is identified by the outline 17, 63, 64 and 65, whereas the legal size working area is identified by the outline 17, 63, 66, 67, 68 and 65.

Thus, it can be seen that the photoconductor's working area, and also the bordering area which must be erased, vary with letter and legal size paper conventionally used in a copier.

U.S. Pat. Nos. 3,751,155 and 3,809,472, as well as the IBM TECHNICAL DISCLOSURE BULLETIN of July 1976, at pages 393 and 394, are incorporated herein by reference as examples of the state of the art of means to accomplish the erase function, and the present invention is not to be limited to the specific means disclosed in FIG. 3.

In FIG. 3 the photoconductor drum 10 is shown in an unrolled, flat state. A drum position transducer 56, not shown, controls energization of interimage erase lamp 51 through paper size logic 55 to cause the lamp to be turned on at drum position 69 for letter size paper and at drum position 70 for legal size paper. Subsequently, the lamp is turned off for both size paper at drum position 71, this corresponding to the common leading edge 17 for all original documents referenced against the platen's reference edge 17 of FIG. 1.

Figure 4:
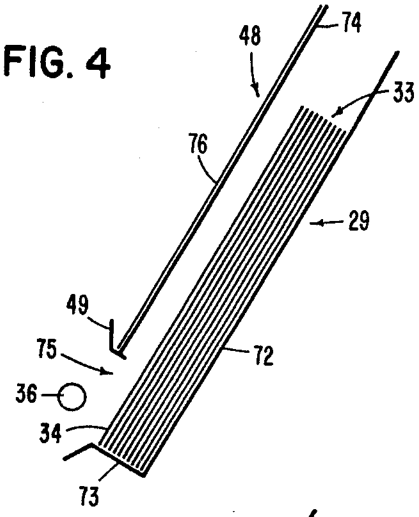
FIG. 4 shows the cassette of FIG. 1 in use as the copier's paper supply and exit tray.
Figure 5:
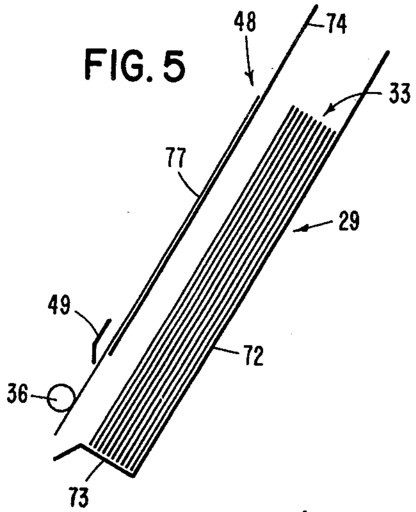
FIG. 5 shows the cassette of FIG. 1 with its gate open, as it would be temporarily during use as the copier's paper supply and bypass entry station.

FIGS. 4 and 5 are conceptual sketches of FIG. 1's cassette 29, and show the box-like shape of the cassette wherein bottom wall 72 and end wall 73 support stack 33. The stationary top wall 74 of the cassette terminates in a slot 75 which exposes the top sheet 34 of this stack for feeding by roller 36. In FIG. 4 gate 49 is closed and a finished copy 76 resides in exit tray 48. In FIG. 5, gate 49 has opened and a bypass sheet 77 has been positioned on top of the stack's top sheet such that this sheet will now cooperate with feed roller 36 and will be fed to the copy process as a substitute for a sheet from stack 33.

By way of an exemplary use, assume that the operator positions an original document on platen 16 and wishes to obtain both a transparency and a plain paper copy of this document. In this case, the copier's copy request dial, not shown, would be set to "2". The FIG. 5 bypass mode of operation would be instituted wherein 77 identifies a blank transparency. The copier's start button would now be depressed and the first copy formed would be on transparency 77. The second copy would be formed on the plain paper constituting the top sheet of stack 33. These two documents would come to rest in the exit tray 48 of FIG. 4.

Figure 6:
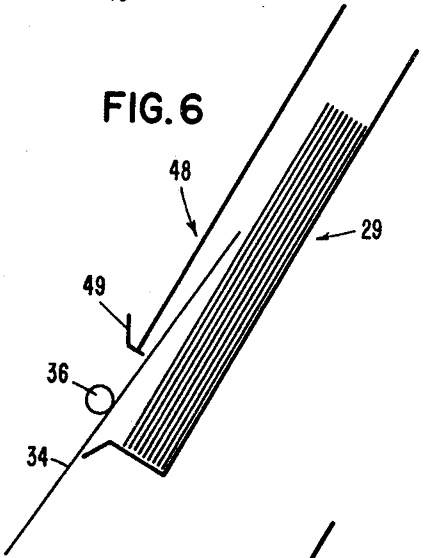
FIGS. 6 through 9 show the sequence of operation in forming a duplex copy.
Figure 7:
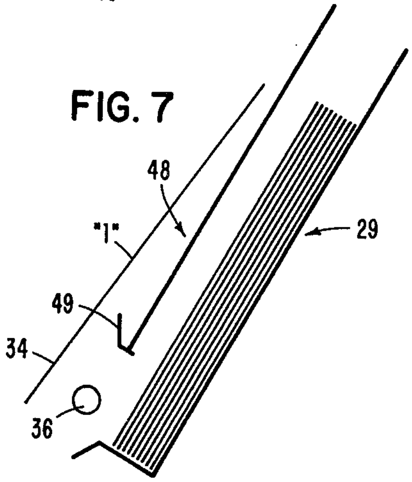
Figure 8:
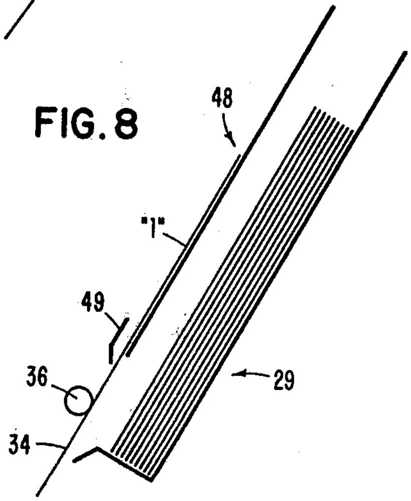
Figure 9:
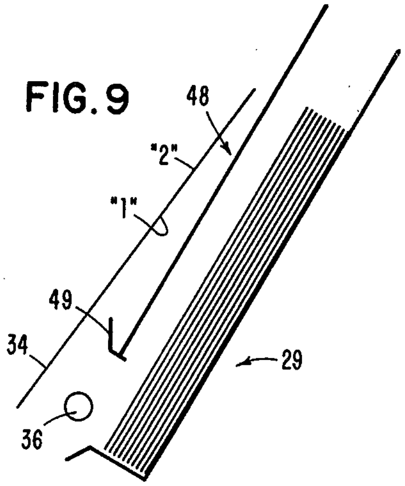

FIGS. 6 through 9 show the sequence of operation in forming a duplex copy. In FIG. 6 the top sheet 34 of the stack is fed to the copy process. It is returned to exit tray 48 with side "1" facing up as shown in FIG. 7. Gate 49 is now opened and sheet 34 is fed to the copy process in the bypass mode of operation, this being FIG. 8. Subsequently, the duplex copy is returned to exit tray 48 with the side "2" facing up, this being shown in FIG. 9.

Figure 10:
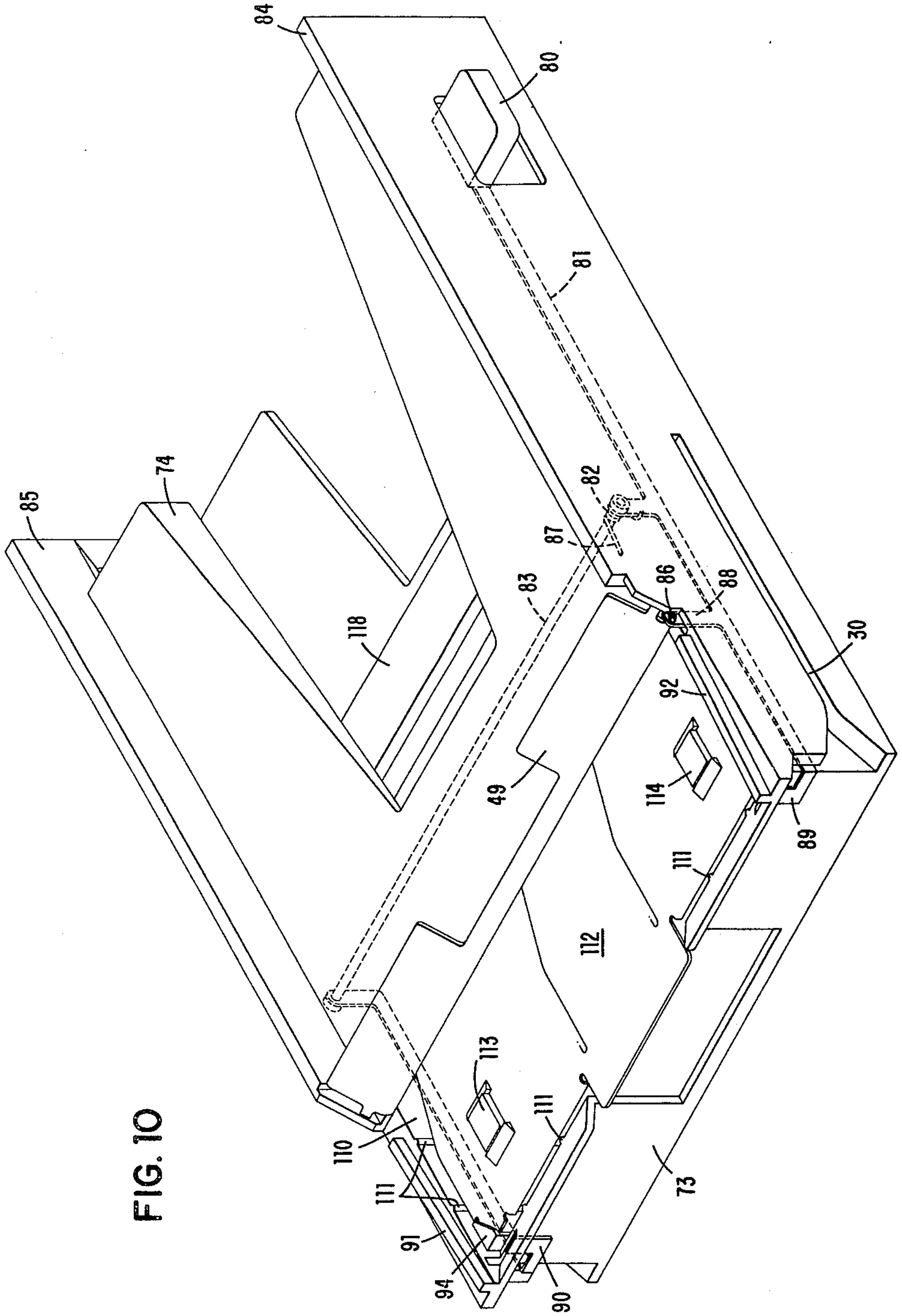
FIG. 10 is a perspective view of a first type of cassette in accordance with the present invention.

FIGS. 10 through 13 show a first type of cassette in accordance with the present invention. With reference to FIG. 10, it can be seen that the cassette's gate 49 is controlled by a manual actuator 80 which comprises an arm assembly 81 which is pivoted at axis 82 defined by rod 83. Rod 83 is rotationally supported in the side walls 84 and 85 of the cassette, and penetrates the cassette at a position above stack 33, and just below the plane defined by the cassette's upper wall 74. Gate 49 is pivoted in side walls 84 and 85 so as to pivot about axis 86. A torsional spring 87 has one end anchored to wall 84 and engages a portion of arm assembly 81 to bias this arm in a counterclockwise direction about its pivot 82. Arm assembly 81 is connected to a lower portion of gate 48 by way of extension 88. Thus it can be seen that when manual actuator 80 is pushed downward, arm assembly 81 rotates clockwise about its pivot 82, and gate 49 rotates clockwise about its pivot 86 to the open position, shown in FIG. 5. At the same time, this clockwise rotation of arm assembly 81 elevates paper stops 89 and 90 to the position shown in FIG. 12. These paper stops function to aid in longitudinal positioning a bypass sheet in the proper paper feeding position. This cassette also includes a pair of alignment guides 91 and 92 which function to properly laterally align a bypass sheet as its leading edge moves under open gate 49 on the way to paper stops 89 and 90.

Once a bypass sheet is properly positioned, either manually or by force of gravity, the gate closes and applies a slight load on the paper. This load is great enough to hold the bypass sheet in its proper position with paper stops 89 and 90 lowered, but does not interfere with feeding of the bypass sheet by paper feed roller 36.

Figure 13:
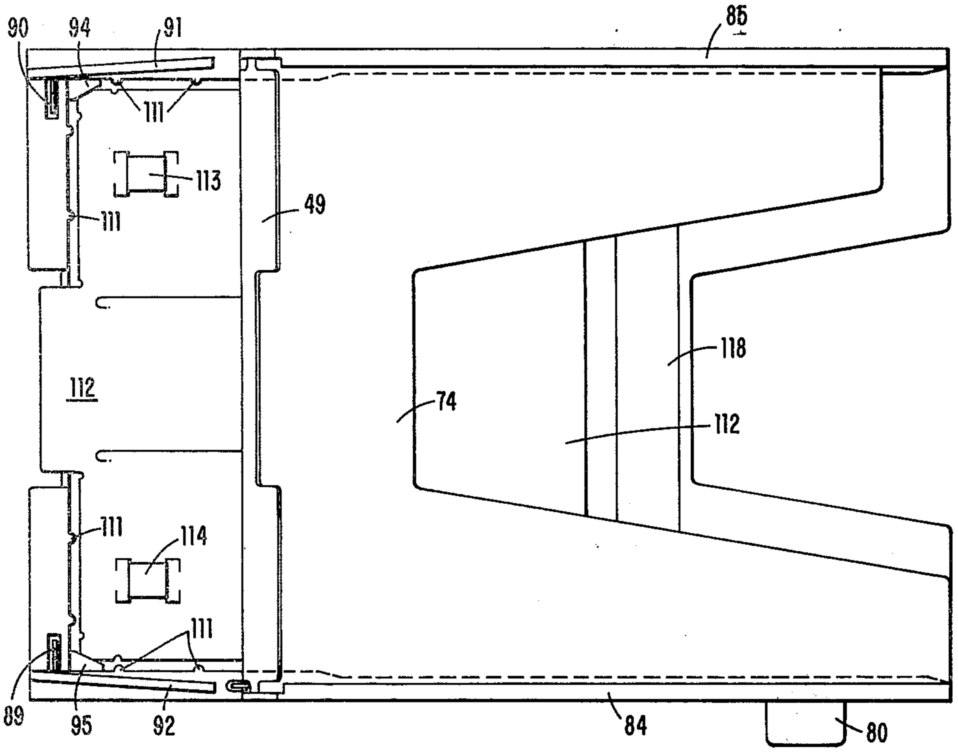
FIG. 13 is a top view of the cassette of FIG. 10.

As shown in FIG. 13, the leading edge 93 of paper stack 33 cooperates with corner bucklers 94 and 95 such that paper is fed from stack 33, one sheet at a time, in accordance with the well known buckler paper feed principle. A bypass sheet does not cooperate with corner bucklers 94 and 95. The width of the cassette's exit pocket, as defined by the spacing of walls 84 and 85, is wider than the width of the cassette's paper supply compartment, as defined by wall 110 and its vertical ridges 111. Wall 84 includes a similar width-defining wall, shown in FIG. 13. Ridges 111 are also included in wall 73.

Figure 11:
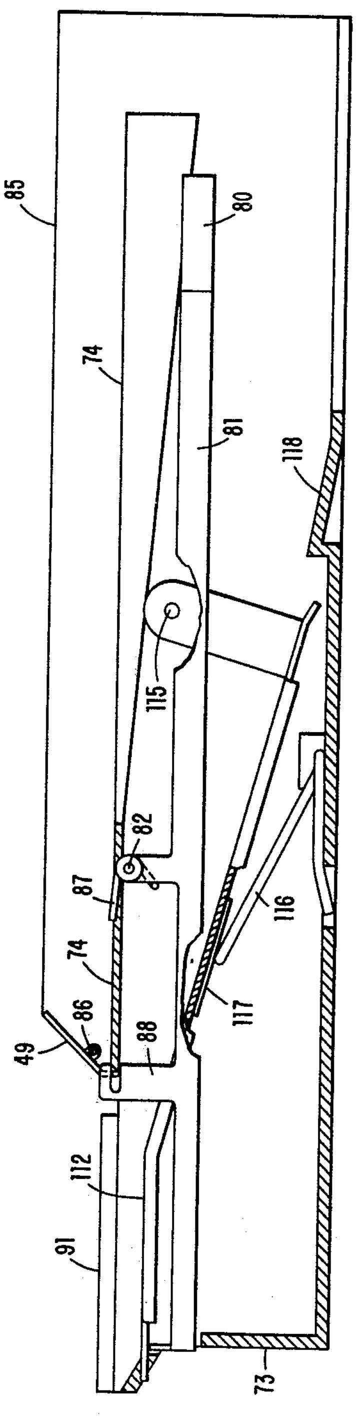
FIGS. 11 and 12 are side views of the cassette of FIG. 10, FIG. 11 showing the gate closed, and FIG. 12 showing the gate open and the paper stops raised.
Figure 12:
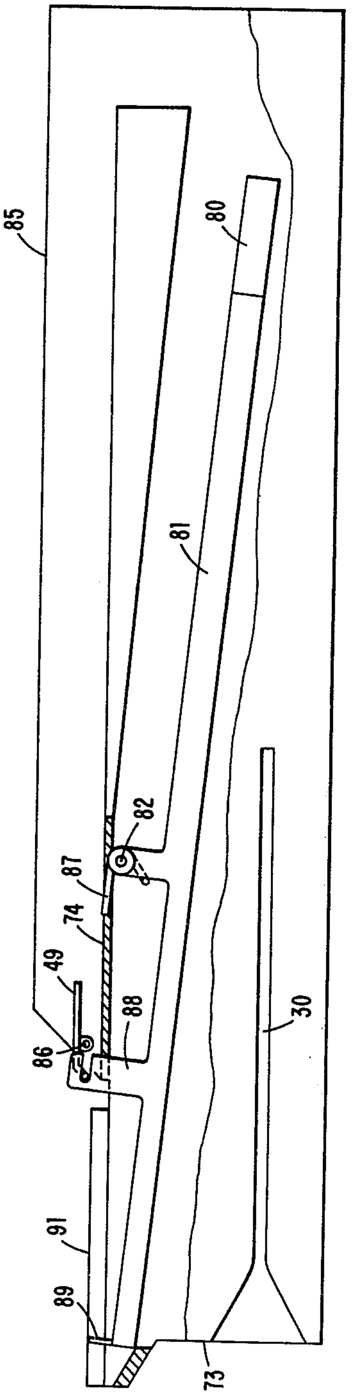

The portion of the stack cooperating with paper feed means 36 is supported by spring-biased floor member 112. As seen in FIG. 10, this member includes two resilient pads 113 and 114, in an embodiment which includes two similarly spaced paper feed rollers comprising paper feed means 36. As seen in FIG. 11, floor member 112 is pivotally mounted on side walls 84 and 85 so as to pivot about axis 115. A torsion spring 116 cooperates with a low-friction surface 117 on the underside of member 112, causing member 112 to be biased upward toward corner separators 94 and 95. FIG. 11 shows floor member 112 engaging corner separators 94 and 95. This is the position member 112 assumes when no sheets are in the cassette. The cassette includes an inclined surface 118 which is generally an extension of the inclined portion of floor member 112.

Figure 14:
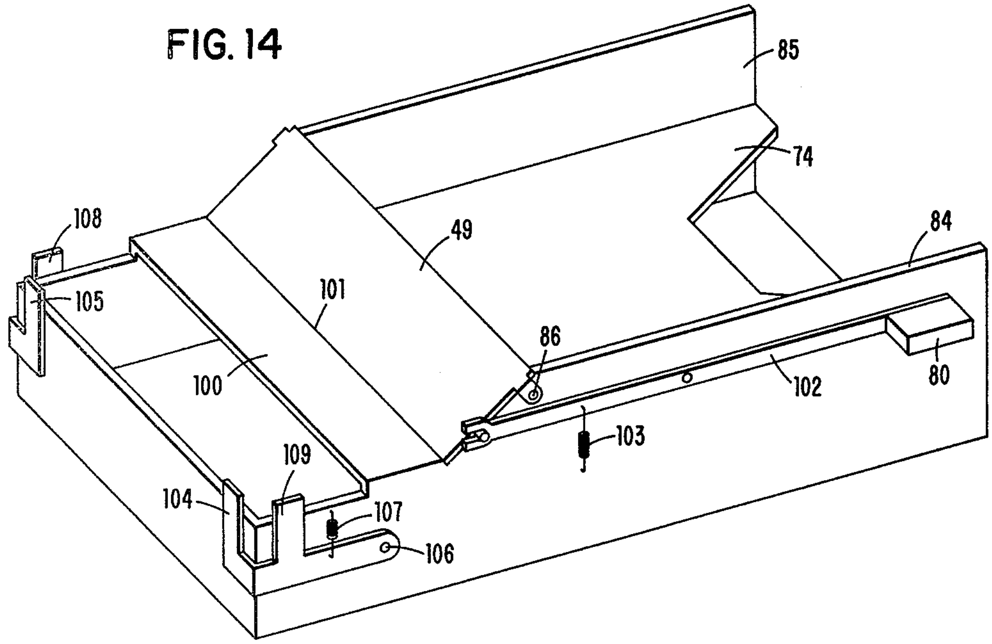
FIG. 14 is a perspective view of another cassette in accordance with the present invention.

FIG. 14 shows an alternate form of cassette wherein like reference numerals identify like structural members. In this cassette, upper wall 74 includes an extension 100 which extends beyond the edge 101 of gate 49. Also, arm assembly 102 is connected only to rotate gate 49 about its pivot 86, the gate being held closed by spring 103. In this cassette, both lateral and longitudinal paper positioning is accomplished by paper stops 104 and 105. These paper stops are biased to their upward position, about pivot axis 106, by means of a pair of return springs 107. With this type of cassette, the paper feed mechanism of FIG. 2 includes an extension on arm 38 (not shown) such that energization of paper feed solenoid 37 causes paper stops 104 and 105 to rotate counterclockwise about their axis 106, lowering these paper stops such that paper can be fed either from stack 33 or from the bypass entry station without obstructing paper stops 104 and 105.

In the various embodiments above described, it is noted that gate 49 lightly rests upon a bypass sheet during feeding of this sheet to the copier's transfer station. It is within the scope of this invention to provide means such as a solenoid to hold gate 49 open during feeding of the bypass sheet, if desired. By way of example, opening of the gate could be sensed, to thereby energize a solenoid which would hold the gate open until a later time when the solenoid would be deenergized as a function of the occurrence of a copy cycle event such as a unique position of the photoconductor drum.

While preferred embodiments of the invention have been described, it is to be understood that the present invention is not limited to these precise disclosures, and that the invention is defined by the scope of the appended claims.

What is claimed is:

1. A cassette for use with a sheet feed mechanism of a copier or the like to provide sheet supply storage, bypass sheet feeding and output copy tray functions, comprising:

a frame having upper and lower spaced walls forming a chamber for storing a stack of supply sheets and including an opening at one end of said upper wall for permitting serial extraction of sheets from said chamber by the feed mechanism; and means forming a tray on said upper wall external to said chamber, including gate means positioned at the edge of said tray nearest said frame opening, said gate means being movable between a first closed position for retaining sheets in said tray, as said output tray function, and a second open position for allowing a sheet to be moved from said tray into interleaving relation between sheets in said chamber and the feed mechanism, as said bypass sheet feeding function.

2. The cassette defined in claim 1 wherein said gate is temporarily moved to said open position, and paper stop means concomitantly temporarily moved to a position to obstruct and thus position such an interleaved sheet, said gate thereafter closing to lightly imprison such a sheet between said gate and said upper wall, as said paper stop means moves to a position whereat paper feed of such a sheet is no longer obstructed.

3. The cassette defined in claim 2 including a manual operator for said gate and said paper stop means, and means biasing said manual operator to effect gate closure and unobstruction of paper feed.

4. The cassette defined in claim 1 including a manual operator for said gate, and means biasing said manual operator to effect gate closure.

5. The cassette defined in claim 4 including movable paper stop means normally in a position to obstruct paper feed and operable to facilitate positioning of such an interleaved sheet.

6. The cassette defined in claim 5 wherein said paper stop means includes means to position such an interleaved sheet both in the direction of sheet feed and normal thereto.

7. The cassette defined in claim 2 wherein said stop means operates to position such an interleaved sheet in the direction of sheet feed, the side walls of said cassette including alignment guide means operable to align sheets in a direction normal to the direction of sheet feed.

8. The cassette defined in claim 7 including a manual operator for said gate and said paper stop means, and means biasing said manual operator to normally effect gate closure and movement of said paper stop means to an unobstruction of paper feed position.

9. A cassette for use with a copier or the like having sheet feeding means, said cassette providing sheet supply storage for a stack of sheets to be used in the copy process, and also providing a bypass sheet entry station for use in allowing a bypass sheet to be substituted for a sheet of the stack, comprising:

a frame having upper and lower spaced walls forming a chamber for storing a stack of supply sheets, and including an opening at one end of said upper wall for permitting extraction of the top sheet of a stack; and means forming a tray on said upper wall external to said chamber and including movable gate means adjacent said opening, said gate means being movable between a first closed position and a second open position, said gate in said open position allowing a bypass sheet to be moved from said tray into overlying relation to said opening and the underlying stack.

10. The cassette defined in claim 9 wherein said gate in said closed position is operable to lightly hold a bypass sheet in its overlying relation, while being inoperative to interfere with feeding of the bypass sheet.

11. The cassette defined in claim 10 including paper stop means and means operable to move said stop means to a feed-obstructing position as said gate is opened, said paper stop means facilitating accurate positioning of the bypass sheet in the direction of paper feed.

12. The cassette defined in claim 11 including a manual operator operable to effect opening of said gate means and concomitant movement of said paper stop means, and means biasing said manual operator to a gate-closed position.

13. The cassette defined in claim 12 including side walls joining said upper and lower walls, and sheet alignment means included in said side walls operable to align sheets in a direction normal to sheet feed.

14. The cassette defined in claim 10 including movable paper stop means having a feed-obstructing position and operable in such a position to facilitate positioning of the bypass sheet in the direction of sheet feed.

15. A copier comprising:

a loop-shaped paper path through which paper passes in the production of a copy;

cassette guide means adjacent the entry of said paper path for supporting a paper supply cassette;

a cassette having upper and lower spaced walls forming a chamber for storing a stack of sheets and side walls joining said upper and lower walls, the lower portion of said upper wall terminating at an opening for permitting serial extraction of sheets from said chamber to the entry of said paper path, guide means formed in at least one of said cassette walls cooperating with said cassette guide means to support said cassette as a portion of said copier;

means forming an exit tray on said upper wall of said cassette external to said chamber, adjacent the exit of said paper path, and including paper gate means positioned at said cassette opening, said gate means being movable between a closed position for retaining finished copies in said tray, and an open position for allowing a bypass sheet to be moved from said tray into superposed position to the top sheet of a stack within the container.

16. The copier defined in claim 15 wherein said cassette guide means is operable to support said cassette so that its upper and lower walls are at an obtuse angle such that sheets in said exit tray are gravity-registered against said gate, and bypass sheets gravity-feed under said gate when it is open.

17. The copier defined in claim 16 wherein said cassette includes a manual operator controlling the position of said gate, and means biasing said manual operator to a gate-closed position.

18. The copier defined in claim 17 including paper stop means located on the opposite side of said opening from said gate, and controllable by said manual operator to move into a paper obstructing position when said gate is open, said paper stop means then limiting the extent of gravity-feed of a bypass sheet in the direction of sheet feed.

19. The copier defined in claim 17 including movable paper stop means located on the opposite side of said opening from said gate and operable to limit the extent of gravity-feed of a bypass sheet in the direction of sheet feed.

20. The copier defined in claim 18 wherein said cassette side walls include alignment guides operable to align sheets in a direction normal to sheet feed.

21. The copier defined in claim 15 wherein said cassette includes a gate operator, and means biasing said gate to a gate-closed position.

22. The copier defined in claim 21 including movable paper stop means located on the opposite side of said opening from said gate and operable to provide a means for registering a bypass sheet in the direction of paper feeding.

23. The copier defined in claim 22 wherein said cassette side walls include alignment guides operable to align sheets in a direction normal to sheet feed.

24. The copier defined in claim 23 wherein said operator is a manual operator and wherein movement of said manual operator against its bias to a gate-open position concomitantly moves said paper stop means to said registering position.

25. The copier defined in claim 17 including interimage erase means, and switch means associated with said gate means, and controlling said erase means to effect erase for large size paper whenever said cassette is removed, or whenever said gate is moved to said open position.

26. The copier defined in claim 21 including interimage erase means, and switch means associated with said gate means, and controlling said erase means to effect erase for large size paper whenever said cassette is removed, or whenever said gate is moved to said open position.

27. The copier defined in claim 25 or 26 wherein said interimage erase means is operable to effect erase for large size paper for the first and second sheets of paper of a multicopy copier use, the actual size of the second sheet being measured to thereafter effect erase of its sensed size.

28. A combined copy sheet supply and output tray cassette for use with a copier which includes a copy sheet input mechanism adjacent an input slot and exits completed copies at an output slot, comprising:

a sheet supply section having an opening for cooperating with the copier input mechanism, an output tray overlying said sheet supply section, a gate mechanism in a wall of said tray, and means for selectably actuating said gate mechanism for allowing a bypass sheet to be interposed into the copier input mechanism to the exclusion of sheets in said supply section whenever said gate mechanism is actuated.

29. The cassette defined in claim 28 including means for registering a bypass sheet at a proper position in the direction of paper feed while said gate mechanism is actuated.

30. The cassette defined in claim 29 wherein said gate in its not-actuated position lightly holds a bypass sheet properly registered.

* * * * *